E. A. ROPER AND J. W. HARTLEY.
WEIGHING APPARATUS.
APPLICATION FILED NOV. 14, 1918.
1,392,659.
Patented Oct. 4, 1921.
3 SHEETS—SHEET 1.
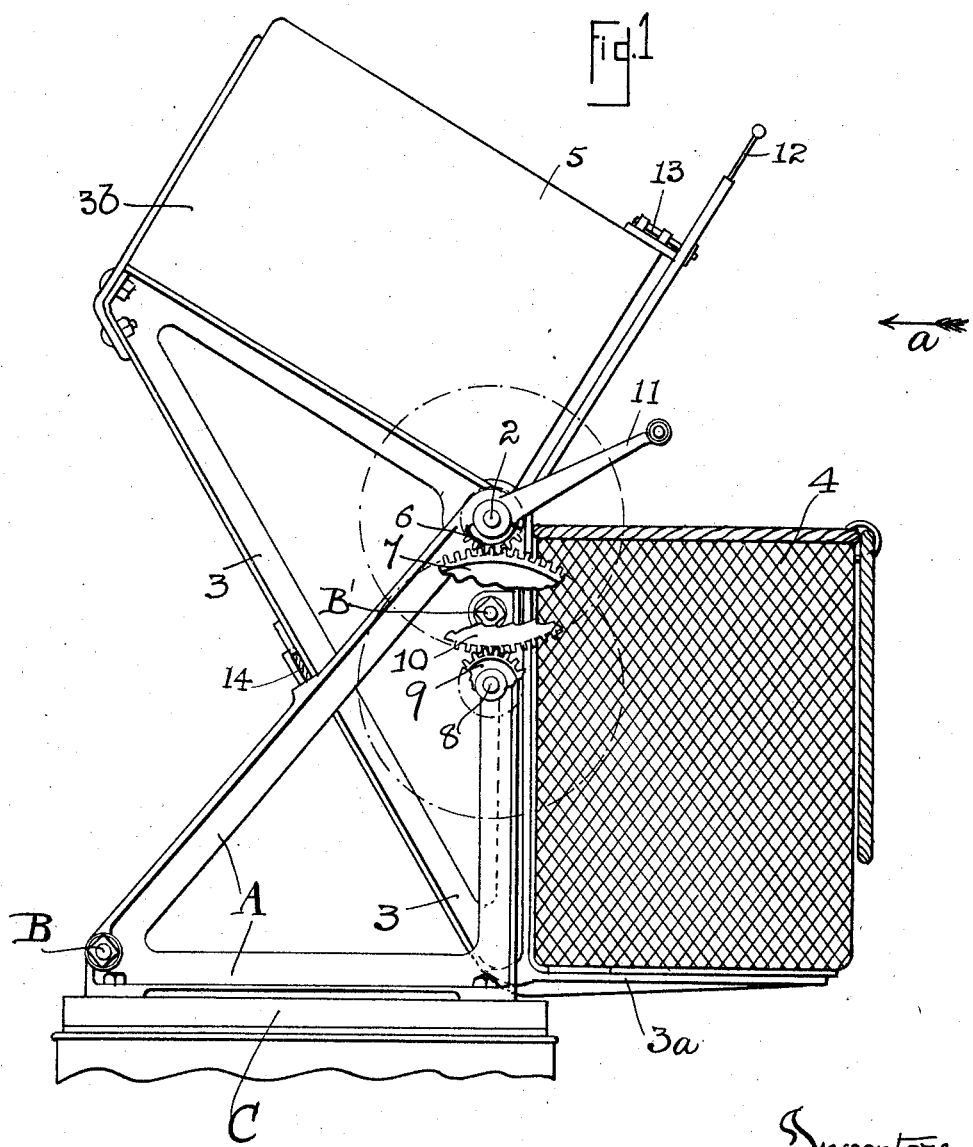

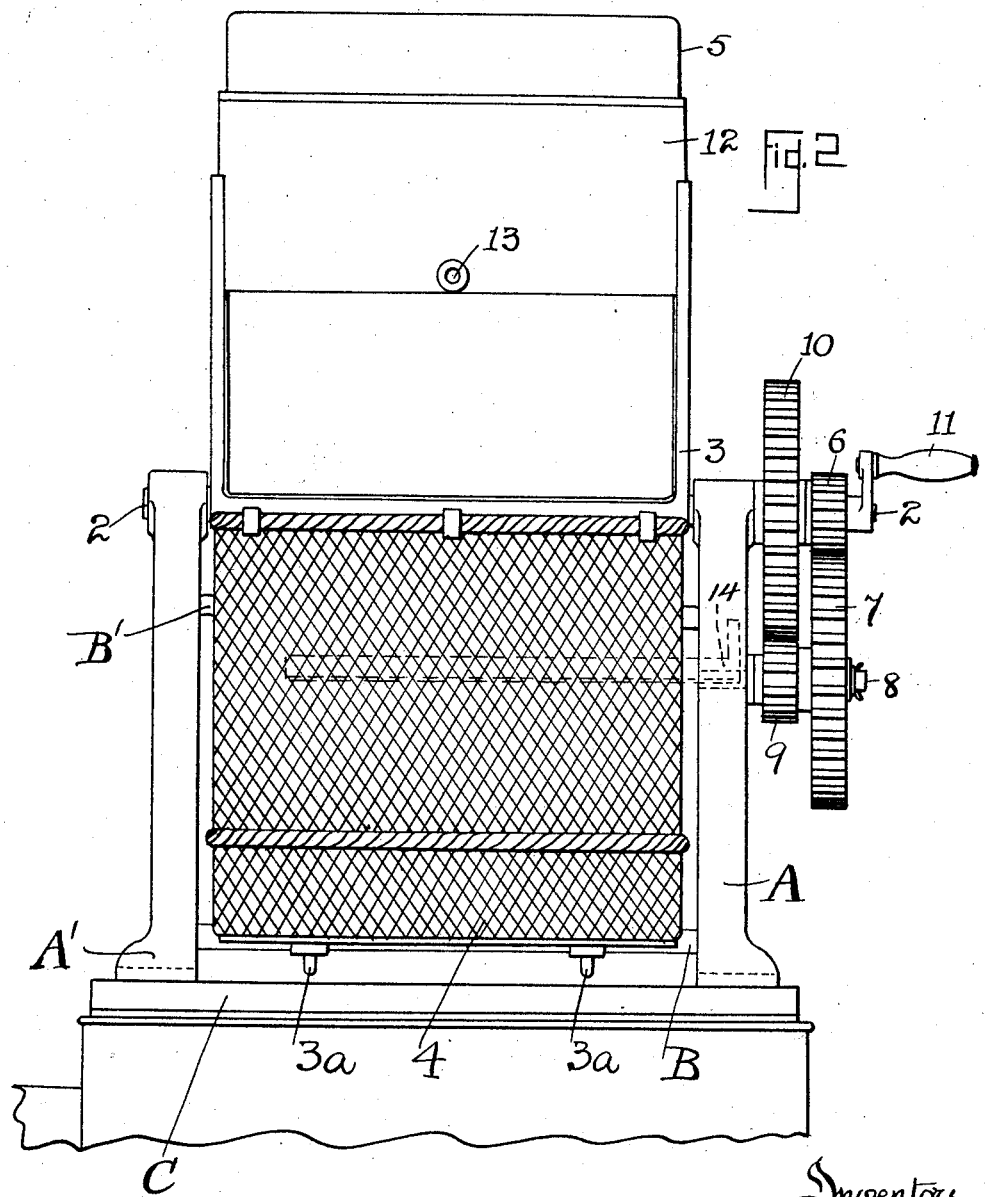

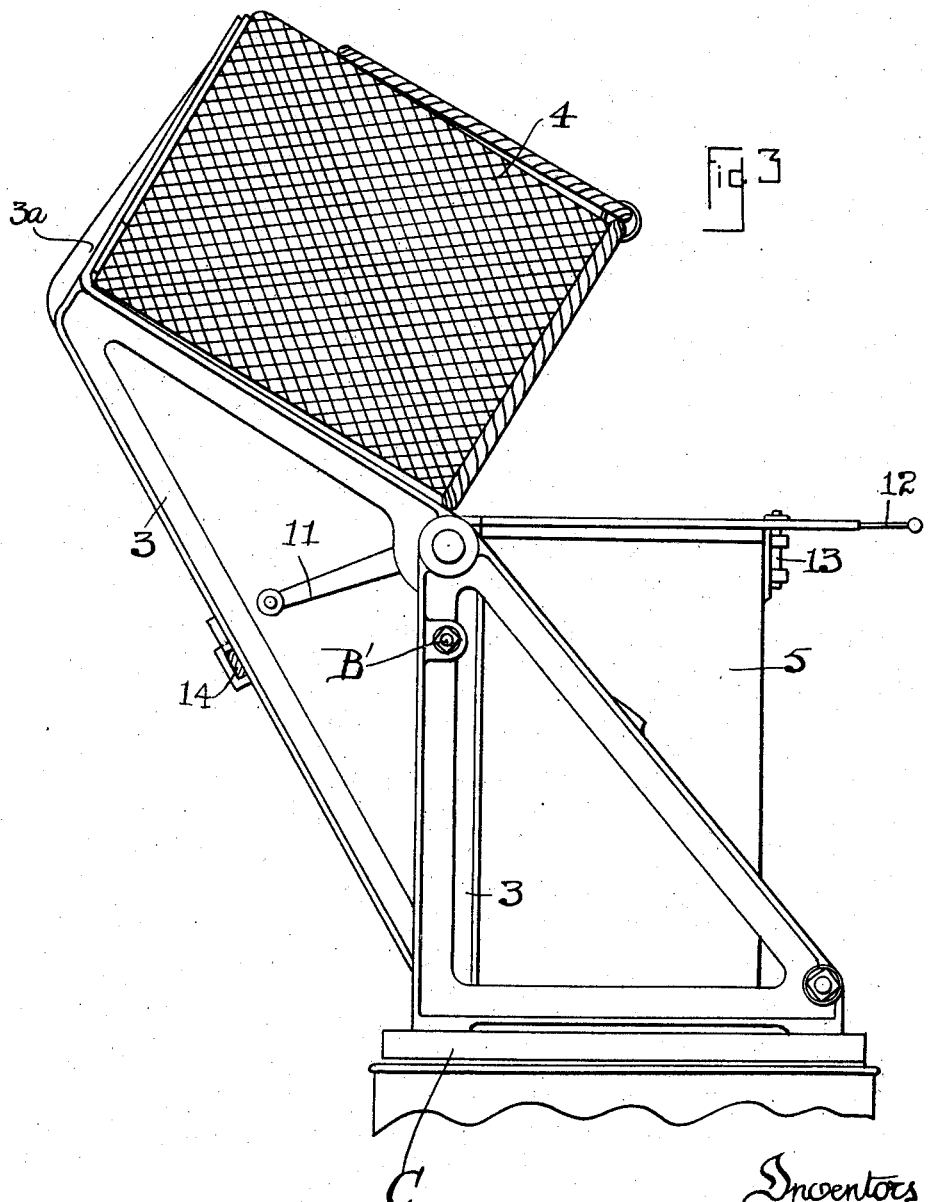

UNITED STATES PATENT OFFICE.

ERNEST ABRAHAM ROPER, OF OAKWORTH, NEAR KEIGHLEY, AND JOHN WILLIAM HARTLEY, OF HAWORTH, NEAR KEIGHLEY, ENGLAND.

WEIGHING APPARATUS.

1,392,659.   Specification of Letters Patent.   Patented Oct. 4, 1921.

Application filed November 14, 1918. Serial No. 262,435.

*To all whom it may concern:*

Be it known that we, ERNEST ABRAHAM ROPER and JOHN WILLIAM HARTLEY, subjects of the King of Great Britain, and residents, respectively, of Thorn Cottage, Bogthorn, Oakworth, near Keighley, in the county of York, England, and Main street, Haworth, near Keighley aforesaid, have invented a certain new and useful Improvement in or Appertaining to Weighing Apparatus, of which the following description, having reference to the accompanying drawings, is a specification.

Our invention relates to improvements in or appertaining to weighing apparatus, particularly for use in ascertaining the weight of the contents of receptacles, such as skeps or the like which are filled with balls of yarn or of bobbins, tubes cops or the like upon which yarn is wound, and our said invention consists in the application or provision of means whereby the receptacle may be readily weighed both in its full and empty state in order that the weight of the contents thereof may be accurately determined, this being effected by quickly transferring the contents of the receptacle to a bin or the like and back again into said receptacle after having weighed same in its empty condition.

In the accompanying sheets of drawings which are illustrative of our invention:—

Figure 1 is an end or side elevation of apparatus constructed in accordance with our invention.

Fig. 2 is a front view of the parts shown by Fig. 1 as seen in the direction indicated by the arrow *a*.

Fig. 3 is a similar view to Fig. 1 but illustrates the apparatus as seen in the opposite direction and with certain of the parts in their reversed or altered positions.

A A¹ indicate the end frames of the machine; B B¹ the cross rails which bind said end frames together.

In carrying our invention into effect we mount upon the end frames A A¹ a cross shaft 2 upon which is fixed framework or extending arms 3 so that said arms 3 may have others arms 3ª and 3ᵇ extending from them, the former being so shaped as to receive a detachable skep or receptacle 4 while the latter 3ᵇ may have fixed upon it a bin or receptacle 5.

Mounted loosely on the outer end of the shaft 2 is a toothed pinion 6 which meshes or gears with a wheel 7 mounted upon a stud 8 and having fixed to it a pinion 9 which gears or meshes with a wheel 10 fixed upon the shaft 2 so that by the handle or winch 11 being fixed to the wheel 6 as said handle is rotated the frame 3 and its extending arms 3ª, 3ᵇ together with the receptacles 4 and 5 carried by these latter may be oscillated from the positions which they occupy as shown by Figs. 1 and 2 into the positions that they occupy as shown by Fig. 3. The opening leading into the receptacle 5 is covered by a sliding door 12 so that the contents of said receptacle 5 may be retained by said door as and when desired, the position of the door in Figs. 1 and 2 is shown as sufficiently open to permit the contents of the receptacle 5 to descend by gravity into the receptacle 4 when the several parts are placed in the positions shown by Figs. 1 and 2.

In making use of our improved apparatus the skep 4 and its contents are weighed in any appropriate weighing apparatus adjoining the mechanism described, so that on the weight of said receptacle 4 and its contents being ascertained, said receptacle may be removed from the weighing apparatus and placed upon the arms 3ª as shown by Figs. 1 and 2. The attendant may then operate the handle 11 so as to move the framework and receptacle from the positions shown by Figs. 1 and 2 into the position shown by Fig. 3 in which position the contents of the receptacle 4 will descend into the receptacle 5 on which the lid or cover 12 may be closed and bolted or secured in position by the bolt 13 so that the attendant may then again operate the handle 11 to return the framework 3 and the two receptacles 4 and 5 back to their former positions shown by Figs. 1 and 2 where they may be secured by the sliding bolt 14 being moved to overhang the framework A. The empty skep 4 may then be removed and its weight obtained so that by deducting said weight from the gross weight first before ascertained the net weight of its former contents is shown.

After this the bolt 14 may be removed and the skep may then be returned to its position upon the arms 3ª on which the attendant may open the door 12 so that the contents of the receptacle 5 will thus descend by gravity and be returned to the skep 4 which is thus ready for removal to afford space for the next skep to be dealt with.

It is obvious that instead of having the weighing apparatus entirely free from the apparatus hereinbefore described, we may bolt or otherwise fix the whole mechanism upon the scale-pan or platform C of any suitable weighing machine, and then balance same by weights on the other arm or arms of said weighing machine in order to enable the user to employ the ordinary standard weights on said machine to ascertain the relative weights of the goods and their receptacles.

Such being the nature and object of our said invention, what we claim is:—

1. In apparatus for use in weighing balls of yarn, bobbins, tubes, cops and the like, framework, oscillating arms mounted on said framework, a receptacle fixed upon said arms, on one side of their pivotal supports, means or extensions from said arms on the other side of their said supports for receiving a detachable receptacle and means for operating said oscillating arms.

2. In apparatus for use in weighing balls of yarn, bobbins, tubes, cops and the like, framework, oscillating arms mounted on said framework, a receptacle fixed upon said arms on one side of their pivotal supports, extensions from said arms on the other side of their said supports for receiving a detachable receptacle, means for operating said arms and apparatus for weighing the detachable receptacle and its contents.

3. In apparatus for use in weighing balls of yarn, bobbins, tubes, cops and the like, framework, oscillating arms mounted on said framework, a receptacle fixed upon said arms on one side of their pivotal supports, a lid or cover mounted upon said receptacle, extensions from said arms on the other side of their said supports for receiving a detachable receptacle, means for operating said arms and apparatus for weighing the detachable receptacle and its contents.

4. In apparatus for use in weighing balls of yarn, bobbins, tubes, cops and the like, a weighing machine, framework fixed upon the scale pan or platform of said machine, oscillating arms mounted on said framework, a receptacle fixed upon said arms, on one side of their pivotal supports, means or extensions from said arms on the other side of their said supports for receiving a detachable receptacle and means for operating said oscillating arms.

ERNEST ABRAHAM ROPER.
JOHN WILLIAM HARTLEY.